Feb. 15, 1944.  R. M. CRITCHFIELD  2,341,695
FLYWHEEL
Filed Nov. 12, 1941
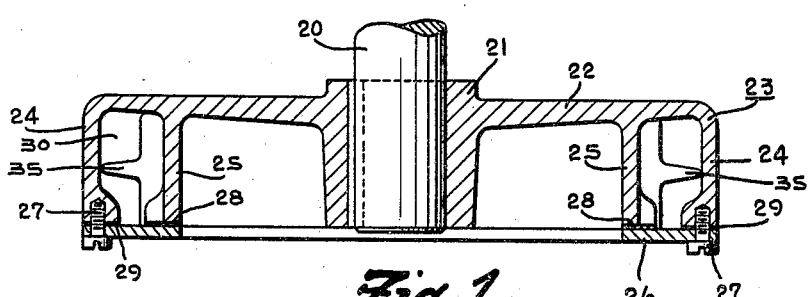
Fig. 1
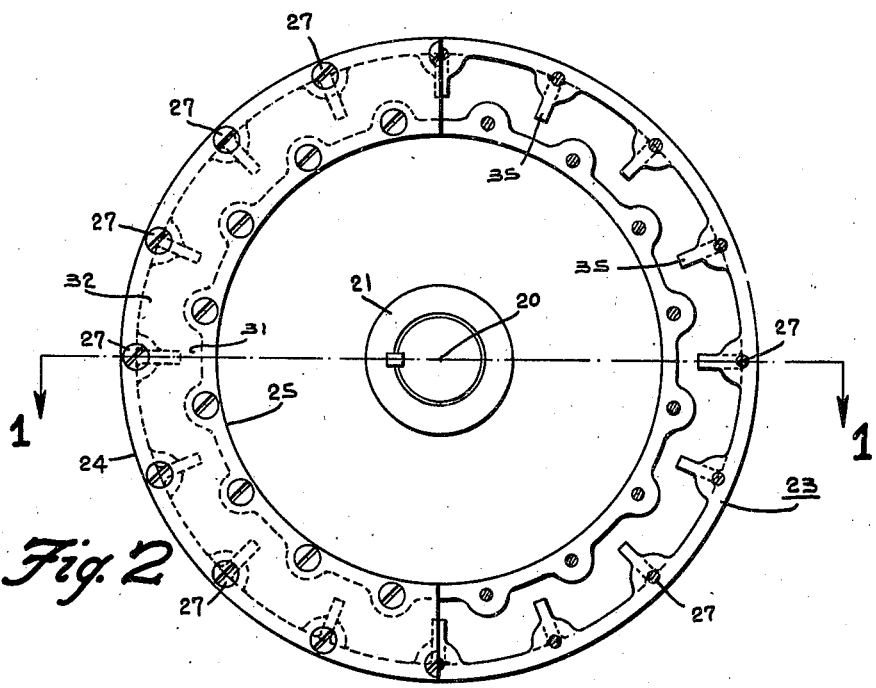
Fig. 2
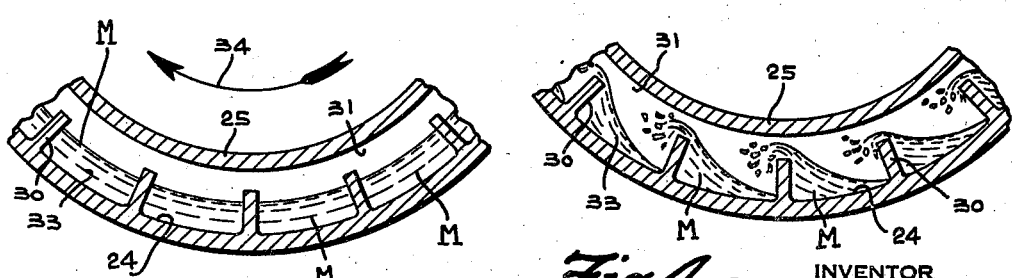
Fig. 3
Fig. 4
INVENTOR
ROBERT M. CRITCHFIELD
BY Spencer Hardman + Fehr
his ATTORNEYS Patented Feb. 15, 1944

2,341,695

UNITED STATES PATENT OFFICE 2,341,695

FLYWHEEL

Robert M. Critchfield, Anderson, Ind., assignor to General Motors Corporation, Detroit, Mich., a corporation of Delaware Application November 12, 1941, Serial No. 418,749

6 Claims. (Cl. 74—572)

This invention relates to flywheels for use with apparatus such as engine starters of the momentum type wherein an electric motor rotates a flywheel at relatively high speed before the starting apparatus is connected with the engine and wherein the energy stored in the flywheel is combined with the power of the motor when the apparatus is connected with the engine to be started.

It is an object of the present invention to reduce the shock which the starting apparatus and the engine are required to withstand when the rotating flywheel is connected with the engine. To accomplish this object I provide a flywheel having means whereby the kinetic energy will be more gradually released when the flywheel is connected with the load. The flywheel is provided with a hollow rim which contains a quantity of mercury which, due to centrifugal force, is forced against the outer wall of the flywheel rim. From this outer wall there extend inwardly a number of baffles spaced from the inner wall of the flywheel rim. When the rotating flywheel is connected with the load and there is a tendency to reduce the speed of the flywheel, the mercury confined in the pockets between the baffle tends to move relative to the flywheel and to spill over the free edges of the baffles. The baffles may be provided also with notches through which some of the mercury must pass when the flywheel tends to lag behind the mercury. Because the speed of all the mercury is not suddenly reduced to the speed of the flywheel, when the speed of the flywheel is reduced as the load is applied, the kinetic energy given up to move the load is less than the kinetic energy available in the mercury, the amount of kinetic energy given up to start the load being dependent on the average speed reduction of the total mass of mercury. As the load or work shaft continues to rotate, the mercury comes to a state of equilibrium in which it all rotates at the same speed as its flywheel enclosure. In taking up the speed of the flywheel, the mercury gives up kinetic energy to assist the flywheel in carrying the load; and, in doing so, it assists the electric motor which drives the rotating masses to increase its speed.

Further objects and advantages of the present invention will be apparent from the following description, reference being had to the accompanying drawing wherein a preferred embodiment of the present invention is clearly shown.

In the drawing:

Fig. 1 is a sectional view on line 1—1 of Fig. 2.

Fig. 2 is an end elevation of a flywheel constructed in accordance with the present invention, the front cover being broken away on the right half of the figure.

Fig. 3 is a fragmentary sectional view showing the relation of the mercury to the baffles within the hollow rim of the flywheel when the rim is rotating at the speed required for storing the desired amount of energy.

Fig. 4 is a fragmentary view similar to Fig. 3, but showing the relation of the mercury to the baffles at the time the flywheel is connected with the load.

In Fig. 1, 20 designates a shaft to be connected with the load such as a shaft on an engine to be started through suitable gearing and connecting devices which may include a friction torque-limiting clutch not shown. To the shaft 20 is keyed the hub 21 of a flywheel having a web 22 connecting the hub 21 with a hollow rim 23 defined by an outer wall 24 and an inner wall 25 and a removable cover plate 26 attached by screws 27 with gaskets 28 and 29 between the rim 24 and the cover 26. From the inside of rim 24 there extend inwardly a plurality of baffles 30 which terminate short of the inner wall 25 of the rim to provide passages 31 connecting the various pockets 32 which receive the mercury 33 when the flywheel is in motion for example as indicated by arrow 34 (Fig. 3). Some, if not all, of the baffles 30 may be provided with notches or weirs 35 of the depth required to give the required amount of retardation of the motion of the mercury when the load or work shaft is connected with the flywheel.

Let it be assumed that the flywheel is rotating clockwise as indicated by arrow 34 in Fig. 3, the mercury M which is in fact the major portion of the rotating mass of the flywheel, is forced outwardly against the wall 24 by centrifugal force. When the shaft 20 is connected with a load such as the shaft of an engine to be started, there is a reduction in the speed of the flywheel and therefore relative movement takes place. Since the mercury M is a fluid mass rotating with the flywheel, there is a tendency for the mercury M to continue rotating at the same speed as obtained before the load was applied. Therefore, there is relative motion between the mercury M and the flywheel in the direction of the arrow 34 and the mercury piles up against the baffles 30 at the left ends of the pockets 33 as shown in Fig. 4; and some of the mercury spills over the top of the baffles or moves through the passages 31 as indicated in Fig. 4. Some of the mercury also flows through the weirs 35 of the baffles. It is therefore apparent that only a part of the mercury is materially reduced in speed when the flywheel is connected with the load. During the act of starting the load into motion, the energy given up by the flywheel is determined by the weight of the mass which is rotating and the average speed reduction of the mass as a whole. Since the mercury can move relative to the flywheel over the edges of the baffles 33 and through the notches 35 thereof, the average speed reduction of the total mass of mercury is very much less than that which would exist if the same weight of mercury were a solid mass connected with the flywheel.

As the load shaft, for example the shaft of an engine to be started, begins to rotate, there is a gradual diminution of relative motion between the mercury and the flywheel and a gradual increase in the energy given up by the mercury to the load shaft.

A flywheel constructed in accordance with the present invention provides for a gradual release of the kinetic energy of the rotating mass due to the fact that, when the flywheel is connected with the load shaft there is relative rotation between the mercury and the flywheel container. This relative rotation is then at a maximum and gradually diminishes while the release of the kinetic energy of the mercury gradually increases as the load shaft accelerates under the power of the driving electric motor, such acceleration being assisted by the kinetic energy released by the mercury.

While mercury is mentioned herein, it is to be understood that the present invention embraces the use of any mobile liquid. Water could be used effectively, if the volume of the space within the rim be made large. However, mercury is preferred on account of its high specific gravity as well as mobility. With a mercury flywheel, it is possible to store a larger amount of kinetic energy with a given volume of material than when using a conventional flywheel having a solid iron rim.

While the embodiment of the present invention as herein disclosed constitutes a preferred form, it is to be understood that other forms might be adopted, all coming within the scope of the claims which follow.

What is claimed is as follows:

1. A flywheel having a hollow rim defined by inner and outer cylindrical walls and side walls and containing a liquid and provided with spaced notched baffles extending from the inside of the rim outer walls to provide a plurality of pockets, each baffle terminating short of the rim inner wall to provide a continuous passage beyond the free edges of the baffles to permit liquid to spill over the free edges of the baffles.

2. A flywheel having a hollow rim defined by inner and outer cylindrical walls and side walls and containing a liquid and provided with spaced baffles extending from the inside of the rim outer walls to provide a series of chambers, said baffles terminating short of the rim inner wall to provide a continuous passage above the edges of the baffles permitting some of the liquid to spill over the edges of the baffles, some of the baffles, at least, being provided with weir notches, said notches extending from the bottom of the baffles and having its greatest dimension at the edge of the baffles.

3. A flywheel having a hollow rim defined by inner and outer cylindrical walls and side walls containing a liquid and provided with spaced barriers extending from the inside of the rim outer walls and terminating short of the inner wall to form side-by-side pockets and also form a continuous passage between the inner wall and the edges of the baffles to permit liquid to spill over the edges of the baffles each barrier being provided with a notch, said notches being arranged circumferentially in alignment with each other through which liquid may flow and the cross sectional area of each notch being such that after a spilling operation the liquid is regulably controlled when the liquid passes from one pocket to another.

4. A flywheel having a rim defined by inner and outer walls parallel with the axis of the flywheel and a bottom wall connecting said inner and outer walls to form a circular channel to receive a quantity of liquid; baffles extending from the bottom wall of the outer wall to form side-by-side chambers, said baffles terminating short of the inner wall to permit liquid to spill over the top of the baffles, some of the baffles at least being spaced transversely of the channel to provide a tapering passage through which the liquid may flow and the cross-sectional area of each passage being so dimensioned that liquid stream is regulated gradually when the liquid passes from one chamber to the other.

5. A flywheel having its rim provided with a circular channel containing a liquid, a plurality of plates arranged transversely across said channel to provide a series of pockets, said plates terminating short of the innermost side of the channel to establish communication between the pockets and also to permit spilling of liquid over the free edges of the plate from one pocket to the adjacent pocket, said plates also having V-shaped notches so positioned that the liquid is regulably controlled for an appreciable time after the spilling operation.

6. A flywheel having a hollow rim defined by inner and outer cylindrical walls and side walls containing a liquid and provided with spaced notched baffles extending from the inside of the rim outer walls to provide a plurality of pockets between the walls, said baffles terminating short of the rim inner wall to provide a continuous passage between the rim inner wall and the free edges of the baffles to permit liquid in one pocket to spill over the free edges of the baffles into the adjacent pocket, said baffles being provided also with tapered notches, said notches being formed in the baffles so that the greatest width of the notch is at the free edges of the baffles so that the liquid is regulably controlled for an appreciable time after the spilling operation.

ROBT. M. CRITCHFIELD.